United States Patent
Noguchi et al.

(10) Patent No.: US 6,458,432 B1
(45) Date of Patent: Oct. 1, 2002

(54) PROCESS FOR PRODUCING MAGNETIC DISK

(75) Inventors: Hitoshi Noguchi; Junichi Nakamikawa; Shinji Saito, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/995,274

(22) Filed: Nov. 26, 2001

(30) Foreign Application Priority Data

Nov. 24, 2000 (JP) ........................... 2000-357743

(51) Int. Cl.$^7$ ................................. H01F 1/00
(52) U.S. Cl. .................... 427/549; 427/128; 427/130; 427/550; 427/599; 428/65.3; 428/694 R; 428/900
(58) Field of Search ................. 427/549, 128, 427/130, 550, 599; 428/65.3, 694 R, 900

Primary Examiner—Bernard Pianalto
(74) Attorney, Agent, or Firm—Stroock & Stroock & Lavan LLP

(57) ABSTRACT

A process for producing a magnetic disk having a randomly oriented magnetic powder, comprises: applying a magnetic coating solution containing at least a magnetic powder to a web that is being continuously conveyed, so as to prepare a magnetic layer; applying a first external magnetic field to the magnetic layer while the magnetic layer is wet; and applying a second external magnetic field to the magnetic layer while the magnetic layer is wet, wherein: the first external magnetic field is applied with a set of a first pair of same-pole-opposed magnets with the web interposed therebetween and a second pair of same-pole-opposed magnets with the web interposed therebetween; the first and second pairs are provided on the same plane of the web and on two equal sides of an isosceles triangle so that a perpendicular line dropped from a base of the isosceles triangle forms a line perpendicular to a conveying direction of the web; and the second external magnetic field is an alternating magnetic field, and is applied with a pair of magnets with the web interposed therebetween; the pair of magnets being provided on the same plane of the web, and in a direction perpendicular to the conveying direction of the web.

5 Claims, 1 Drawing Sheet

PROCESS FOR PRODUCING MAGNETIC DISK

BACKGROUND OF THE INVENTION

1. Field of the Invention

The present invention relates to a process for the production of a magnetic recording disk and more particularly to a process for the production of a particulate type magnetic disk, which has a magnetic layer where a ferromagnetic powder is dispersed in a binder, suitable for high density recording involving a specific orientation method.

2. Description of the Related Art

In the art of magnetic disk, the trend is for more 2 MB MF-2HD floppy disks made of Co-modified iron oxide to be normally mounted on personal computers. However, the capacity of such a 2MB MF-2HD floppy disk is not necessarily sufficient under today's circumstances where the amount of data to be treated has shown a sudden increase. It has thus been desired to increase drastically the capacity of floppy disks.

As a magnetic recording medium there has heretofore been widely used one obtained by applying a magnetic layer having an iron oxide, Co-modified iron oxide, $CrO_2$, ferromagnetic metal powder and hexagonal ferrite powder dispersed in a binder to a support. Among these materials, ferromagnetic metal powder and hexagonal ferrite powder are known to have excellent high density recording properties.

Examples of magnetic disks include large capacity disks comprising a ferromagnetic metal powder having excellent high density recording properties such as 10 MB MF-2TD and 21 MB MF-2SD, and large capacity disks comprising hexagonal ferrite such as 4 MBMF-2ED and 21 MB floptical. However, these magnetic disks leave something to be desired in capacity and performance. Under these circumstances, many attempts have been made to improve high density recording properties. During the process of development, the following knowledge has been found concerning the orientation of magnetic material.

It is important that a ferromagnetic powder itself has a high acicularity ratio to realize a high coercive force due to its anisotropy in shape. It is important in a tape-like medium that the magnetic layer itself has a raised magnetic orientation in the direction according to the running direction of the head. In a rotary recording medium such as floppy disk, it is more important that the variation of output in the circumferential direction is minimized than the magnitude of output is maximized because digital recording is effected. It is thus important that the magnetic orientation in the magnetic layer is so-called random orientation free of anisotropy (i.e., orientation ratio (anisotropy in magnetic orientation in the plane of magnetic layer normally represented by the ratio of squareness ratio in a predetermined direction to squareness ratio in the direction perpendicular to that direction as a measure) of close to 1).

In order to realize high density recording, it is important to reduce the particle size of the magnetic powder further. However, a problem has arisen during the development of a large capacity floppy disk having a face recording density of greater than 0.2 Gbit/inch$^2$ that as the particle size of the magnetic material decreases, there occur more noises. In order to inhibit the generation of noises, it is necessary that the agglomeration of magnetic particles to each other be eliminated and the content of vertical magnetization components (vertically magnetized components) be reduced. In order to meet these requirements, orientation becomes a great factor. Further, as the particle size of the magnetic powder decreases, the dispersion of the magnetic powder in the binder during the preparation of the magnetic layer coating compound is made difficult, making it difficult to obtain the desired orientation even after the application of the magnetic layer coating compound to the support.

As techniques for random orientation of magnetic powder in a magnetic layer there have heretofore been proposed the following approaches.

JP-A-6-36261 (The term "JP-A" as used herein means an "unexamined published Japanese patent application") discloses a recording medium having a lower non-magnetic layer and a thin magnetic layer obtained by ATOMM (Advanced Super Thin Layer & High Output Metal Media Technology) which comprises performing random orientation under wet conditions, and then performing oblique orientation to attain an in-plane and vertical orientation ratio of not smaller than 0.85 and a vertical squareness ratio of from 0.3 to 0.65. In some detail, a magnetic disk which can give a uniform and high circumferential output and excellent overwrite properties as compared with those obtained by the conventional orientation-free processing and a process for the production thereof are provided. However, the ferromagnetic powder used in the examples is as large as 0.20 μm and 195 angstrom as calculated in terms of major axis length and crystalline size, respectively.

JP-A-63-148417 discloses a process which comprises applying an alternating magnetic field while the magnetic layer is undried to perform random orientation, wherein the intensity of magnetic field is from 1/10 to 1/1 of Hc of the ferromagnetic powder and the frequency of the alternating magnetic field is from 1/10 to 1/1 of the coating speed. In accordance with this approach, the range of the intensity of magnetic field is predetermined while the relationship between the frequency and the coating speed is predetermined within a predetermined range. In this arrangement, the orientation ratio of 1 can be continuously maintained to enable stable random orientation. Although the approach disclosed in the above cited patent can perform three-dimensional random orientation, a sufficient S/N ratio cannot be secured. Further, the magnetic materials used in the examples of the above cited patent are $\gamma$-$Fe_2O_3$ and Co-containing $\gamma$-$Fe_{O3}$ having Hc of from 240 to 600 Oe. However, a particulate magnetic material having a high coercive force (Hc) required for high density recording (particularly a magnetic metal powder or hexagonal tablet-like hexagonal ferrite having a high as value) is subject to agglomeration. Thus, it is necessary to take a measure for inhibiting noises.

JP-A-1-248321 discloses a process which comprises performing random orientation shortly after vertical orientation. This invention contemplates the combined use of vertical orientation and random orientation that makes it possible to provide a medium having little mechanical orientation, a high orientation ratio and good modulation properties (variation of reproduced output in the circumferential direction on the magnetic disk). However, this approach is disadvantageous in that since vertical orientation has been once effected, the vertical component of magnetization, which factor is the target of control in the present invention, tends to grow. Further, in the examples of the above cited patent, a magnetic powder having a particle size as large as 0.25 μm as calculated in terms of major axis length and an acicularity ratio as large as 10 is used. Such a magnetic powder having a relatively large particle size and large acicularity ratio can easily be arranged parallel to the surface of the magnetic layer. However, these examples leave something to be desired in attaining a sufficient orientation because a magnetic metal powder having a small major axis length and a small acicularity ratio must be used to secure a high S/N ratio essential for high density recording.

JP-A-63-171428 discloses a process which comprises subjecting a particulate ferromagnetic material to orientation in a magnetic field in a predetermined direction, and then subjecting the ferromagnetic material to orientation in a weak alternating magnetic field in the direction almost perpendicular to that of the former magnetic field for random orientation. However, since the magnetic powder used in the examples of the above cited patent is $\gamma$-$Fe_2O_3$, which has a small magnetizability than magnetic metal powder, sufficient electromagnetic properties cannot be obtained.

JP-A-1-105328 discloses a process which comprises subjecting a magnetic material to crosswise orientation, and then subjecting the magnetic material to uniform deorientation in a solenoid to which an alternating magnetic field is applied. In the above cited patent, it is certain that the in-plane orientation ratio can be improved. However, there is no definition on the inhibition of agglomeration of magnetic particles and vertical magnetization. Thus, this approach leaves something to be desired in attaining a high S/N ratio.

JP-B-5-53009 (The term "JP-B" as used herein means an "examined Japanese patent application") discloses a process which comprises arranging a plurality of bar-shaped orientation magnets apart from each other at a certain interval in the direction of conveyance of the support such that the polarity of magnets differ from that of adjacent magnets and these magnets are disposed oblique to the conveying direction and face in the direction opposed to that of adjacent magnets, where by random orientation is allowed. In this arrangement, a good modulation can be certainly obtained, attaining a high orientation ratio. However, since the magnetic powder used in the examples of the above cited patent is $\gamma$-$Fe_2O3$, which has a small magnetizability than magnetic metal powder, sufficient electromagnetic properties cannot be obtained. Further, since there is no random orientation apparatus using an alternating magnetic field, modulation is deteriorated unless the intensity of magnetic field of the bar-shaped orientation magnet is predetermined to be not greater than 50 Oe. A particulate magnetic metal cannot be sufficiently oriented in such a low magnetic field.

As mentioned above, there have been disclosed many techniques for performing so-called random orientation free from anisotropy as magnetic orientation in the magnetic layer in the production of magnetic disk. However, no effective means have been found for realizing desired orientation and reducing noises even by reducing the particle size and acicularity ratio of magnetic powder to increase the coercive force thereof for the purpose of performing high density recording.

SUMMARY OF THE INVENTION

Therefore, an object of the invention is to provide a production process suitable for the provision of a large capacity magnetic disk suitable for digital recording having good electromagnetic properties, S/N ratio and modulation which can provide a desired orientation and eliminate agglomeration of magnetic particles to each other to reduce noises even if the particle size and acicularity ratio of the magnetic powder are reduced to enhance the coercive force thereof.

The inventors made extensive studies. As a result, it was found that the use of the following production process makes it possible to accomplish the object of the invention, i.e., obtain a desired orientation, eliminate the agglomeration of magnetic particles to each other and reduce the content of vertically magnetized components to reduce noises, thus obtaining a large capacity magnetic disk suitable for digital recording having good electromagnetic properties, S/N ratio and modulation. Thus, the present invention has been worked out.

In other words, the present invention has the following constitutions.

(1) A process for producing a magnetic disk having a randomly oriented magnetic powder, which comprises: applying a magnetic coating solution containing at least a magnetic powder to a web that is being continuously conveyed, so as to prepare a magnetic layer; applying a first external magnetic field to the magnetic layer while the magnetic layer is wet; and applying a second external magnetic field to the magnetic layer while the magnetic layer is wet, wherein: the first external magnetic field is applied with a set of a first pair of same-pole-opposed magnets with the web interposed therebetween and a second pair of same-pole-opposed magnets with the web interposed therebetween; the first and second pairs are provided on the same plane of the web and on two equal sides of an isosceles triangle so that a perpendicular line dropped from a base of the isosceles triangle forms a line perpendicular to a conveying direction of the web; and the second external magnetic field is an alternating magnetic field, and is applied with a pair of magnets with the web interposed therebetween; the pair of magnets being provided on the same plane of the web, and in a direction perpendicular to the conveying direction of the web.

(2) The process for producing a magnetic disk according to Clause 1, wherein the same-pole-opposed magnets in each of the first and second pairs are a pair of permanent magnets, and the intensity of magnetic field in a center of a gap between the opposed permanent magnets in each of the first and second pairs is from 1/3 to 10 times the coercive force of the magnetic layer.

(3) The process for producing a magnetic disk according to Clause 1, wherein the random orientation by the application of an alternating magnetic field is effected in such a manner that the intensity of the second external magnetic field is from 1/40 to 10 times the intensity of the first external magnetic field.

(4) The process for producing a magnetic disk according to Clause 1, wherein the magnetic powder is a ferromagnetic metal powder having Hc of from 114 to 280 kA/m (from 1,400 to 3,500 Oe) and an average major axis length of from 0.01 $\mu$m to 0.18 $\mu$m.

(5) The process for producing a magnetic disk according to Clause 1, wherein the magnetic powder is a hexagonal ferrite magnetic material having an average plate diameter of from 0.01 $\mu$M to 0.1 $\mu$m.

In accordance with the foregoing production process, even when as a magnetic powder there is used one having a small particle size and acicularity ratio and a great coercive force, a desired orientation ratio can be obtained, a vertically magnetized component can be obtained, and the agglomeration of magnetized particles can be relaxed, making it possible to realize the reduction of noise.

The restriction of the orientation ratio (Or) in the plane of the magnetic layer and the squareness ratio (SQn) in the direction perpendicular to the plane of the magnetic layer contributes to the reduction of S/N ratio and modulation. The restriction of the particle size, acicularity ratio and coercive force (Hc) of the magnetic material is needed to secure electromagnetic properties, particularly output.

BRIEF DESCRIPTION OF THE INVENTION

The Reference Numerals and Signs in the drawings are as. follows.

M1; One pair of opposing magnets having the same polarity at the opposing sides

M2: Other pair of opposing magnets having the same polarity at the opposing sides L—L: Central line in the support (indicating the longitudinal direction)

DETAILED DESCRIPTION OF THE INVENTION

The production process of the invention is characterized by applying two kinds of external magnetic fields (first and second external magnetic fields) while a magnetic layer that is formed by coating a coating liquid for a magnetic layer containing a magnetic powder on a support for supporting the magnetic layer (hereinafter referred to a web) is wet. The first external is applied with a set of a first pair of same-pole-opposed magnets with the web interposed therebetween and a second pair of same-pole-opposed magnets with the web interposed therebetween; the first and second pairs are provided on the same plane of the web and on two equal sides of an isosceles triangle so that a perpendicular line dropped from a base of the isosceles triangle forms a line perpendicular to a conveying direction of the web. The second external magnetic field applied after the first external magnetic field is an alternating magnetic field, and is applied with a pair of magnets with the web interposed therebetween. The pair of magnets for applying the second external magnetic field is provided on the same plane of the web, and in a direction perpendicular to the conveying direction of the web.

Figure 1A:
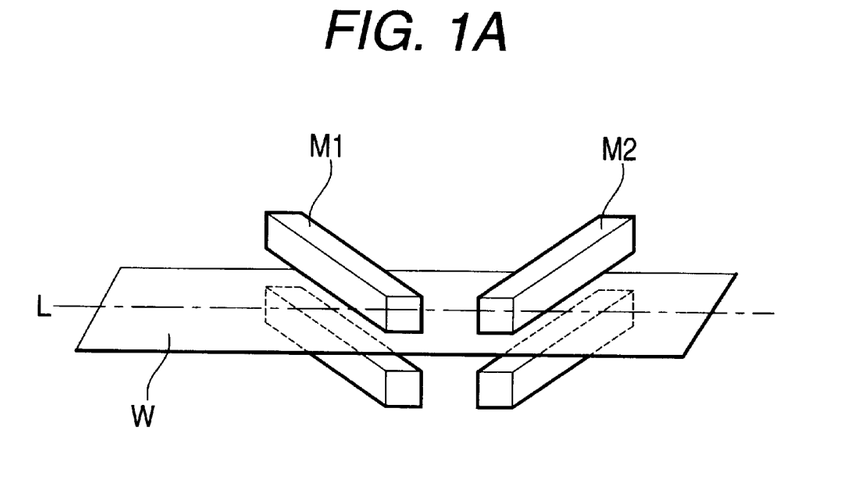
FIGS. 1A and 1B are schematic diagrams illustrating how a set of pairs of magnets, the pairs facing in the opposite directions are oriented in the magnetization process of the invention.
Figure 1B:
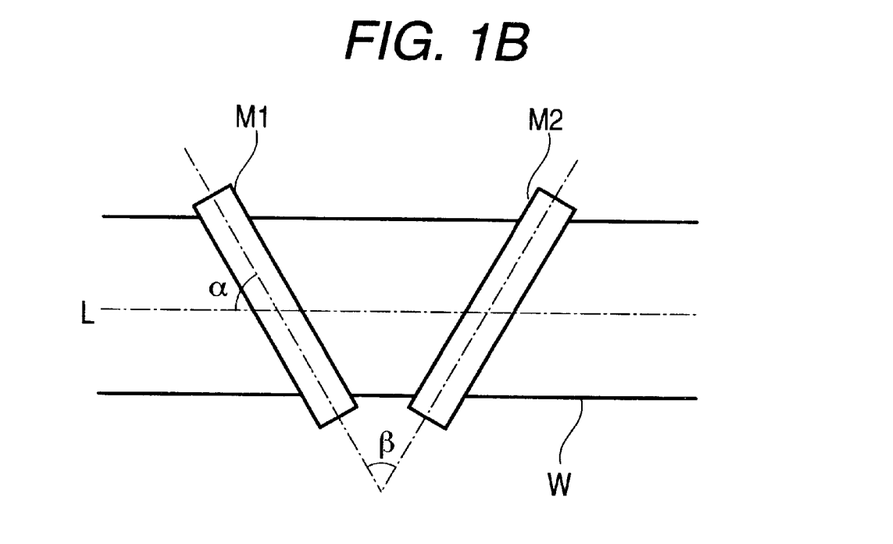

The embodiment for applying the first external magnetic field is further explained with drawings. FIGS. 1A and 1B are schematic diagrams illustrating how a set of two pairs of magnets, and one. pair of permanent magnets wherein the same poles are opposed to each other with the web interposed therebetween (i.e., same-pole-opposed magnets) is provided in an oblique direction and the other pair of same-pole-opposed magnets is provided in a reverse oblique direction thereof. FIGS. 1A and 1B show a typical two-step (or multi-step) magnetic field application of the first external magnetic field. In FIGS. 1A and 1B, the two pairs of same-pole-opposed magnets for forming one set are provided on each of two equal sides. (not shown in FIGS. 1A and 1B) of an isosceles triangle. FIG. 1A is a sketch drawing viewed in an oblique direction (perspective drawing) FIG. 1B is a plane view. In the present specification, the two-direction applications of the external magnetic field are referred to as magnetic field application in an oblique direction and Magnetic field application in a reverse oblique direction, respectively.

The angle α between each of the two equal sides of the isosceles triangle and the longitudinal direction of the web W (i.e., the angle in the oblique direction and the angle in the reverse oblique direction) is preferably from 30° to 60°, more preferably from 40° to 50° (see FIG. 1B). This means that the angle between the magnetic field in the oblique direction and the magnetic field in the reverse oblique direction is more preferably from 80° to 100°. This also means that the angle between the longitudinal axis of one pair of permanent magnets in the oblique direction and that of the other pair of permanent magnets in the reverse oblique direction (the angle between the centerlines of M1 and M2 in FIG. 1B) is more preferably from 80° to 100°. The number of a set consisting of one pair of the same-pole-opposed permanent magnets for the magnetic field application in the oblique direction (e.g., M1 in FIGS. 1A and 1B) and the other pair of the same-pole-opposed permanent magnets for the magnetic field application in the reverse oblique direction (e.g., M2 in FIGS. 1A and 1b) is at least one, preferably one to three.

In the production process of the invention, the intensity of magnetic field in the center of gap in the oblique orientation is preferably from 40 to 560 kA/m (from 500 Oe to 8,000 Oe), more preferably from 80 to 480 kA/m (from 1,000 Oe to 6,000 Oe).

In the random orientation by the application of the second external magnetic field (i.e., alternating magnetic field), the frequency of the magnetic field is preferably from 20 Hz to 200 Hz, more preferably from 40 Hz to 100 Hz. The intensity of the alternating magnetic field in the random orientation is preferably from 4 to 240 kA/m (from 50 Oe to 3,000 Oe), more preferably from 16 to 80 kA/m (from 200 Oe to 1,000 Oe).

The shape and size of the magnet to be used in the production process of the invention are not specifically limited. In practice, however, a bar magnet having a length great enough o cover the support in the crosswise direction is preferred. or example, a bar magnet shielded by a yoke is preferred.

In the present invention, the ambient temperature during production can be properly predetermined but normally can be predetermined to be from 40° C. to 120° C.

The in-plane orientation ratio (Or) of the magnetic disk obtained by the production process of the invention is not smaller than 0.85, preferably not smaller than 0.90, more preferably not smaller than 0.95, ideally 1 with respect to the surface of the magnetic layer. When Or falls below 0.85, the resulting modulation exceeds the tolerance limit, raising the error rate to disadvantage.

The squareness ratio (SQn) in the direction perpendicular to the surface of the magnetic layer in the magnetic disk obtained by the production process of the invention is not greater than 0.30, preferably not greater than 0.28, more preferably from 0.26 to 0.15.

The production process of the invention may relate to the production of a single-layer magnetic disk having a magnetic layer formed directly on a non-magnetic support. The production process of the invention may also relate to a process for the production of a magnetic disk which comprises providing. a substantially non-magnetic subbing layer on a support, and then forming a thin magnetic layer thereon, i.e., the foregoing TOMM type production process.

The term "substantially no-magnetic subbing layer" as used herein is meant to indicate that the subbing layer may be magnetic to an extent such that it doesn't take part in recording and will be hereinafter referred simply to as "underlying layer" or "non-magnetic layer".

In the case where ATOMM type process is employed, the application of the magnetic coating compound and the non-magnetic coating compound may be accomplished by either wet-on-dry process (involving the application of the magnetic layer after the drying of the underlying layer; abbreviated as "W/D") or wet-on-wet process (application of both the two layers while wet; abbreviated as "W/W").

The thickness of the magnetic layer in the magnetic disk obtained by the production process of the invention is preferably from 0.02 μm to 0.5 μm. In order to predetermine the thickness of the magnetic layer to a range of from 0.02 μm to 0.5 μm, the foregoing ATOMM type process is preferably effected. Further, W/W process is preferably used. The magnetic disk obtained by the production process of the invention can be used in a magnetic recording system performing recording at a face recording density as high as from 0.2 to 2 Gbit/inch².

The face recording density is obtained by multiplying the linear recording density by the track density.

The linear recording density is the number of bits of signal to be recorded per inch in the recording direction.

The linear recording density, track density and face recording density are determined by the system.

The magnetic powder to be used in the production process of the invention preferably is a ferromagnetic metal powder or hexagonal ferrite having a coercive force (Hc) of from 110 to 280 kA/m (from 1,400 to 3,500 Oe).

The magnetic powder to be used in the production process of the invention, if it is a ferromagnetic metal powder, has an average major axis length of from 0.01 μm to 0.18 μm, preferably from 0.04 μm to 0.15 μm, more preferably from 0.06 μm to 0.12 μm. When the average major axis length of the magnetic powder exceeds 0.18 μm, it is disadvantageous in that the resulting magnetic disk (hereinafter also referred to as "media") generates a raised noise. On the contrary, when the average major axis length of the magnetic powder falls below 0.01 μm, a sufficient dispersion cannot be attained, making it impossible to exert an effect of reducing noise by the atomization of magnetic material and increasing the surface roughness of the magnetic layer to disadvantage.

The crystalline size of the magnetic powder is from 50 to 180 angstrom, preferably from 80 to 160 angstrom, more preferably from 100 to 150 angstrom. When the crystalline size of the magnetic powder exceeds 180 angstrom, it is disadvantageous in that the resulting media generate a raised noise. On the contrary, when the crystalline size of the magnetic powder falls below 50 angstrom, a sufficient dispersion cannot be attained, making it impossible to exert an effect of reducing noise by the atomization of magnetic material and increasing the surface roughness of the magnetic layer to disadvantage.

The acicularity ratio of the magnetic powder is from 2 to 9, preferably from 4 to 7. When the acicularity ratio of the magnetic powder exceeds 9, the packing of the magnetic layer is reduced, lowering the reproduced output. It is further disadvantageous in that the resulting media generate a raised noise. When the acicularity ratio of the magnetic powder falls below 2, a sufficient coercive force cannot be provided, making the resulting media unsuitable for high density recording. Further, the magnetic material is subject to three-dimensional random orientation that increases the vertical magnetized components and hence raises noise.

In the case where the magnetic powder to be used is a hexagonal ferrite magnetic material, its average plate diameter is from 0.01 μm to 0.1 μm, preferably from 0.02 μm to 0.06 μm, more preferably from 0.03 μm to 0.05 μm. When the average plate diameter exceeds 0.1 μm, it is disadvantageous in that the resulting magnetic disk generates a raised noise. On the contrary, when the average plate diameter falls below 0.01 μm, a sufficient dispersion cannot be attained, making it impossible to exert an effect of reducing noise by the atomization of magnetic material and increasing the surface roughness of the magnetic layer to disadvantage.

The tabularity ratio (plate diameter/plate thickness) of the magnetic powder is from 1 to 7, preferably from 2 to 6, more preferably from 3 to 5. When the tabularity ratio of the magnetic powder exceeds 7, the magnetic material undergoes stacking that raises noise to disadvantage. On the contrary, when the tabularity ratio of the magnetic powder falls below 1, the magnetic material is subject to three-dimensional random orientation that increases the vertical magnetized components and hence raises noise.

The coercive force Hc of the magnetic layer is from 140 to 280 kA/m (from 1,700 to 3,000 Oe), preferably 150 to 230 kA/m (from 1,800 to 2,700 Oe), more preferably 160 to 200 kA/m (from 2,000 to 2,500 Oe). When Hc of the magnetic layer falls below 140 kA/m (1,700 Oe), a high linear density recording cannot be conducted, making it impossible to obtain media having sufficient properties for high capacity recording. On the contrary, when Hc of the magnetic layer exceeds 280 KA/m (3,000 Oe), the state-of-the art recording head cannot sufficiently record signal on the magnetic layer to disadvantage.

In the art of personal computers, which have recently found themselves engrossed more and more in multimedia system, large capacity recording media substituting for the conventional floppy disk have been noted. Such a large capacity recording medium has been put into the market as ZIP disk (face recording density: 96 Mbit/inch²) by IOMEGA INC. (U.S.A.) This is an ATOMM type disk developed by Fuji Photo Film Co., Ltd. The product which has been put into the market has a diameter of 3.7 inch and a recording capacity of 100 MB or more. The recording capacity of from 100 MB to 120 MB is almost the same as that of MO (3.5 inch diameter), which can store data of from 7to 8 month newspaper per sheet. The transfer rate, which indicates the time required to write/read data, is 2 MB or more per second, which is comparable to that of hard disc and 20 times that of the conventional FD or twice that of MO, to great advantage. This magnetic disk, which comprises an underlying layer and a thin magnetic layer, is of the same type as the state-of-the-art FD, i.e., particulate type medium and thus can be mass-produced. Accordingly, this magnetic disk is advantageous in that it is inexpensive as compared with MO and hard disk.

The foregoing process for the production of a magnetic disk by the inventors is a production process for obtaining a magnetic disk having a drastically higher recording capacity than the foregoing ZIP disk or MO (3.5 inch diameter) and a face recording density of from 0.2 to 2 Gbit/inch².

In particular, by incorporating a particulate ferromagnetic powder having a high output and a high dispersibility in a magnetic layer having a thickness as extremely small as 0.02 to 0.5 μm, incorporating a spherical or acicular inorganic powder in a subbing layer, and reducing the thickness of the magnetic layer, cancellation of magnetic force in the magnetic layer can be lessened, the output in a high frequency region can be drastically enhanced, and the overwriting properties can be improved.

By improving the magnetic head and combining it with a narrow gap head, the effect of the ultrathin magnetic layer can be further exerted, making it possible to improve the digital recording properties.

The thickness of the magnetic layer is predetermined to be as small as 0.02 to 0.5 μm to meet the requirements of high density magnetic recording system or magnetic head. The packing of such an extremely thin uniform magnetic layer can be raised by dispersing particulate magnetic and non-magnetic materials with a dispersant and a binder having a high dispersibility in combination. As the magnetic material to be used herein there may be used a ferromagnetic metal powder which is very particulate, can attain a high output, contains much Co and contains Al or Y as a sintering inhibitor to maximize capacity and output. In order to realize a high transfer rate, a three-dimensional network binder system suitable for ultrathin magnetic layer can be used to attain desired running stability and durability during high speed rotation. A composite lubricant which can maintain its effectiveness even during use or high speed rotation under wide humidity and temperature conditions can be incorporated in the two layers. Further, the underlying layer can act as a lubricant reservoir from which a proper amount of the lubricant is always supplied into the upper magnetic layer, making it possible to enhance the durability of the upper magnetic layer and hence enhance the reliability of the magnetic disk. The cushioning effect of the underlying layer can bring about a good head touch and stable running.

ATOMM structure, which is a preferred embodiment of the arrangement of the magnetic disk produced by the process of the invention, has the following advantages:

(1) Improvement of electromagnetic properties by the reduction of the thickness of the magnetic layer
   (a) Enhancement of output in high frequency range by the improvement of recording demagnetization properties
   (b) Improvement of overwrite properties
   (c) Provision of window margin
(2) Enhancement of output by the smoothening of the upper magnetic layer
(3) Easiness of provision of required functions by the separation of functions of magnetic layer
(4) Enhancement of durability by stable supply of lubricant These functions cannot be attained merely by providing a multi-layer magnetic layer. In order to provide such a multi-layer structure, coating solutions of underlying layer and upperlayer are applied. The coated support is then normally subjected to surface treatment such as hardening and calendering Unlike magnetic tape, FD is normally subjected to the same treatment on both sides thereof. After the coating step, the coated supported is subjected to slit step, punching step, step for insertion into shell, and certifying step to complete finished product. The product is then punched into a disk, and then subjected to thermal treatment at a high temperature (normally 50° C. to 90° C.) to accelerate the curing of the coat layers. The disk may then be varnished with an abrasive tape to remove surface rises or otherwise post-treated.

Durability is an important factor for magnetic disk. Examples of the means for enhancing the durability of media include a means for formulating the binder such that the film strength of the disk itself can be raised, and a means for the adjusting the formulation of the lubricant to maintain the slipperiness with the magnetic head.

A plurality of lubricants which each can exert its excellent effect under various humidity and temperature conditions used can be used in combination so that the various lubricants can each perform its function even under wide temperature (low temperature, room temperature, high temperature) and humidity conditions (low humidity, high humidity) to maintain a comprehensively stable lubricating effect.

By making the best use of the two-layer structure such that the underlying layer can exert a tank effect (as a reservoir), the magnetic layer can be invariably supplied with a proper amount of lubricant to enhance the durability of the magnetic layer.

The underlying layer can be rendered capable of retaining a lubricant as well as adjusting the surface resistivity. In general, in order to adjust the electrical resistivity, it is often practiced to incorporate a solid electrolytically-conducting material such as carbon black in the magnetic layer. This restricts the rise of the packing density of the magnetic material. Further, as the thickness of the magnetic layer decreases, this has an effect on the surface roughness of the magnetic disk. The incorporation of an electrically-conductive material in the underlying layer makes it possible to eliminate these defects.

[Magnetic Layer]

The magnetic layer formed by the production process of the invention may be provided on one or both sides of a support. The magnetic layer may be provided directly on the support or on a subbing layer. A proper processing may be conducted to provide a plurality of magnetic layers. The term "thickness of magnetic layer" as used herein is meant to indicate the total thickness of the various magnetic layers. In the case of ATOMM type structure, either W/W or W/D may be employed. From the standpoint of production efficiency, W/W is preferred, but W/D can be sufficiently employed. In the case of multi-layer structure formed by the production process of the invention, the use of W/W makes it possible to form the upper layer and the underlying layer at the same time. Thus, a surface treatment step such as calendering step can be made the effective use of, making it possible to improve even the surface smoothness of ultrathin magnetic layer. The coercive force Hc of the magnetic layer is as defined above. Bm of the magnetic layer is preferably from 2,000 to 5,000 G.

[Ferromagnetic Powder]

The ferromagnetic powder to be used in the magnetic layer to be formed according to the production process of the invention is not specifically limited but is preferably a ferromagnetic metal powder comprising $\alpha$-Fe as a main component. The ferromagnetic powder may contain besides predetermined atoms Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, etc. In particular, at least one of Al, Si, Ca, Y, Ba, La, Nd, Co, Ni and B is preferably contained in the ferromagnetic powder. More particularly, at least one of Co, Y and Al is contained in the ferromagnetic powder. The content of Co is preferably from not smaller than 0 atm-% (atomic percent) to not greater than 40 atom-%, more preferably from not smaller than 15 atm-% to not greater than 35 atm-%, even more preferably from not smaller than 1.5 atm-% to not greater than 12 atm-% based on Fe. The content of Y is preferably from not smaller than 1.5 atm-% to not greater than 12 atm-%, more preferably from not smaller than 3 atm-% to not greater than 10 atm-%, even more preferably from not smaller than 4 atm-% to not greater than 9 atm-% based on Fe. The content of Al is preferably from not smaller than 5 atm-% to not greater than 30 atm-%, more preferably from not smaller than 11 atm-% to not greater than 20 atm-%, even more preferably from not smaller than 12 atm-% to not greater than 18 atm-% based on Fe.

The ferromagnetic powder may be previously subjected to treatment with a dispersant, lubricant, surface active agent, antistat or other treatments described later before dispersion. For the details of this treatment, reference can be made to JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005, and 3,389,014.

The particulate ferromagnetic alloy may contain a small amount of a hydroxide or oxide. One obtained by any known process for the preparation of particulate ferromagnetic alloy may be used. As such a preparation process there may be used the following process. Examples of such a preparation process include a process which comprises the reduction of a composite organic acid salt (mainly composed of oxalate) with a reducing gas such as hydrogen, a process which comprises reducing iron oxide with a reducing gas such as hydrogen to obtain particulate Fe or Fe-Co, a process which comprises the thermal decomposition of a metal carbonyl compound, a process which comprises adding a reducing agent such as sodium borohydride, hypophosphite and hydrazine to an aqueous solution of a ferromagnetic metal to effect reduction thereof, and a process which comprises allowing a metal to be evaporated in a low pressure inert gas to obtain a finely divided powder. The ferromagnetic alloy powder thus obtained may be subjected to any known gradual oxidation involving a method which comprises dipping the ferromagnetic alloy powder in an organic solvent, and then drying the ferromagnetic alloy powder, a method which comprises dipping the ferromagnetic alloy powder in an organic solvent, supplying an oxygen-containing gas into the ferromagnetic alloy powder to form an oxide layer thereon, and then drying the ferromagnetic alloy powder or a method which comprises adjusting the partial pressure of oxygen gas and inert gas free from organic solvent to form an oxide layer on the surface of the ferromagnetic alloy powder.

The coercive force of the ferromagnetic powder is preferably from not smaller than 140 kA/m (1,700 Oe) to not greater than 280 kA/m (3,500 Oe), more preferably from not smaller than 150 kA/m (1,800 Oe) to not greater than 270 kA/m (3,000 Oe).

The water content of the ferromagnetic powder is preferably from 0.01% to 2%. The water content of the ferromagnetic powder is preferably optimized according to the kind of the binder used.

The pH value of the ferromagnetic powder is preferably optimized by the combination with the binder used. The pH value of the ferromagnetic powder is from 4 to 12, preferably from 6 to 10. The ferromagnetic powder may be subjected to surface treatment with Al, Si, P or oxide thereof as necessary. The amount of the surface treatment to be used is from 0.1% to 10% based on the amount of the ferromagnetic powder. The surface treatment is preferably effected because the adsorption of a lubricant such as aliphatic acid is not greater than 100 mg/m$^2$. The ferromagnetic powder occasionally contains a soluble inorganic ion such as Na, Ca, Fe, Ni and Sr ions. It is essentially preferred that the ferromagnetic powder be free of these inorganic ions. However, these inorganic ions have little effect on the properties of the ferromagnetic powder if their content is not greater than 200 ppm. The ferromagnetic powder to be used in the production process of the invention preferably has less voids. The void of the ferromagnetic powder is preferably not greater than 20% by volume, more preferably not greater than 5% by volume. The ferromagnetic powder may be in any form such as needle, grain or spindle so far as the requirements for particle size as previously defined can be satisfied. SFD (Switching Field Distribution) of the ferromagnetic powder itself is preferably small, i.e., not greater than 0.8. The distribution of Hc in the ferromagnetic powder needs to be small. When SFD of the ferromagnetic powder is not greater than 0.8, the ferromagnetic powder exhibits good electromagnetic properties, a high output, a sharp inversion of magnetization and less peak shifts and thus is suitable for high density digital magnetic recording. The reduction of Hc distribution can be by improving the particle size distribution of goethite in the ferromagnetic metal powder or preventing sintering of the ferromagnetic metal powder.

[Non-magnetic Layer]

The details of the underlying layer will be described hereinafter. The inorganic powder to be used in the underlying layer in the production process of the invention is a non-magnetic powder which may be selected from the group consisting of inorganic compounds such as metal oxide, metal carbonate, metal sulfate, metal nitride, metal carbide and metal sulfide. As inorganic compounds there may be used singly or in combination α-alumina having a percent a conversion of not smaller than 90%, β-alumina, γ-alumina, θ-alumina, silicon carbide, chromium oxide, ceriumoxide, α-ironoxide, hematite, goethite, corundum, silicon nitride, titanium carbite, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. Particularly preferred among these inorganic compounds are titanium dioxide, zinc oxide,iron oxide and barium sulfate because they provide small particle size distribution and there are many means of providing function. Even more desirable among these inorganic compounds are titanium dioxide and a-iron oxide. These non-magnetic powders preferably have a particle size of from 0.005 μm to 2 μm. If necessary, non-magnetic powders having different particle sizes may be used in combination or the particle diameter distribution of a single non-magnetic powder may be increased to exert the similar effect. In particular, the particle size of the non-magnetic powder is preferably from 0.01 μm to 0.2 μm. In particular, in the case where the non-magnetic powder is a granular metal oxide, the average particle diameter of the non-magnetic powder is preferably not greater than 0.08 μm. In the case where the non-magnetic powder is an acicular metal oxide, the major axis length of the non-magnetic powder is preferably not greater than 0.3 μm, more preferably not greater than 0.2 μm. The tap density of the non-magnetic powder is from 0.05 to 2 g/ml, preferably from 0.2 to 1.5 g/ml. The water content of the non-magnetic powder is from 0.1% to 5% by mass, preferably from 0.2% to 3% by mass, more preferably from 0.3% to 1.5% by mass. The pH value of the non-magnetic powder is preferably from 2 to 11, particularly from 5.5 to 10. The specific surface area of the non-magnetic powder is from 1 to 100 m$^2$/g, preferably from 5 to 80 m$^2$/g, more preferably from 10 to 70 m$^2$/g. The crystalline size of the non-magnetic powder is preferably from 0.004 μm to 1 μm, more preferably from 0.04 μm to 0.1 μm. The DBP (dibutyl phthalate) oil adsorption of the non-magnetic powder is from 5 to 100 ml/100 g, preferably from 10 to 80 ml/100 g, more particularly from 20 to 60 ml/100 g. The specific gravity of. the non-magnetic powder is from 1 to 12, preferably from 3 to 6. The non-magnetic powder may be in any form such as needle, sphere, polyhedron and tablet. The Mohs hardness of the non-magnetic powder is not smaller than 4, preferably not smaller than 10. The SA (stearic acid) adsorption of the non-magnetic powder is from 1 to 20 μmol/m$^2$, preferably 2 to 15 μmol/m$^2$, more preferably from 3 to 8 μmol/m$^2$. The pH value of the non-magnetic powder is preferably from3 to 6. The non-magnetic powder is preferably subjected to surface treatment with $Al_2O_3$, $SiO_2$, $TiO_2$, $ZrO_2$, $SnO_2$, $Sb_2O_3$, ZnO or $Y_2O_3$. Particularly preferred among these surface treatments are $Al_2O_3$, $SiO_2$, $TiO_2$, and $ZrO_2$ from the standpoint of dispersibility. Even more desirable from these surface treatments are $Al_2O_3$, $SiO_2$, and $ZrO_2$. These surface treatments may be used singly or in combination. Alternatively, co-precipitated surface-treated layer may be used depending on the purpose. The non-magnetic powder may be subjected to treatment with alumina followed by the treatment of the surface layer with silica or vice versa. The surface-treated layer may be porous depending on the purpose but normally is preferably homogeneous and dense.

Specific examples of the non-magnetic powder to be used in the formation of the underlying layer in the production process of the invention include Nanotite (produced by Showa Denko K.K.), HIT-100, ZA-G1 (produced by SUMITOMO CHEMICAL CO., LTD.), α-hematite DPN-250, DPN-250BX, DPN-245, DPN-BX, DPN-500BX, DBN-SA1, DBN-SA3 (produced by TODA KOGYO CORP.), titanium oxide TTO-51B, TTO-55A, TTO-55B, TTO-55C, TTO-55S, TTO-55D, SN-100, α-hematite E270, E271, E300, E303 (produced by ISHIHARA SANGYO KAISHA, LTD.), titanium oxide STT-4D, STT-30D, STT-30, STT-65C, α-hematitea α-40 (produced by Titan Kogyo K.K.), MT-100S, MT-100T, MT-150W, MT-500B, MT-600B, MT-100F, MT-500HD (produced by TAYCA CORP.), FINEX-25, BF-1, BF-10, BF-20, ST-M (produced by SAKAI CHEMICAL INDUSTRY CO., LTD.), DEFIC-Y, DEFIC-R (produced by DOWA MINING CO., LTD.), AS2BM, TiO2P25 (produced by Nippon Aerosil Co., Ltd.), 100A, 500A (produced by Ube Industries, Ltd.), and sintering products thereof. Particularly preferred among these non-magnetic powders are titanium dioxide and α-iron oxide.

By mixing the underlying layer with carbon black, the surface electrical resistivity Rs can be lowered as a known effect. Further, the light transmittance can be reduced, making it possible to obtain a desired micro Vickers hardness. Moreover, by incorporating carbon black in the underlying layer, the effect of storing lubricant can be exerted. As the carbon black there may be used furnace for rubber, thermal for rubber, black for color, acetylene black or the like. The underlying layer should be optimized for the following properties depending on the desired effect. By optimizing these properties in combination, the desired effect can be exerted more effectively.

The carbon black to be incorporated in the underlying layer exhibits a specific surface area of from 100 to 500 $m^2/g$, preferably from 150 to 400 $m^2/g$, and a DBP oil absorption of from 30 to 400 ml/100 g. The particle diameter of the carbon black is from 5 to 80 mμ, preferably from 10 to 50 mμ, more preferably from 10 to 40 mμ. The carbon black preferably exhibits a pH value of from 2 to 10 (as measured by dipping process) a water content of from 0.1 to 10%, and a tap density of from 0.1 to 1 g/ml. Specific examples of the carbon black to be used in the production process of the invention include BLACKPEALS 2000, 1300, 1000, 900, 800, 880, 700, VULCAN XC-72 (produced by Cabot Specialty Chemicals Inc.), #3050B, #3150B, #3250B, #3750B, #3950B, #950, #970B, #850B, MA-600, MA-230, #4000, #4010 (produced by Mitsubishi Chemical Corporation), CONDUCTEX SC RAVEN 8800, 8000, 7000, 5750, 5250, 3500, 2100, 2000, 1800, 1500, 1255, 1250 (produced by Columbian Carbon, Ltd.), and KETJENBLACK EC (produced by Aczo Inc.). The carbon black may be surface-treated with a dispersant, graphitized with a resin or partially graphitized on the surface thereof before use. The carbon black may be previously dispersed in a binder before being added to the coating compound. The carbon black may be used in an amount of not greater than 50% by mass based on the foregoing inorganic powder or not greater than 40% by mass based on the total mass of the non-magnetic layer. These carbon blacks may be used singly or in combination. For the details of carbon black which can be used in the production 5 process of the invention, reference can be made to "Kaabon Burakku Binran (Handbook of Carbon Black)", Association of Carbon Black.

The underlying layer may also comprise an organic powder incorporated therein depending on the purpose. Examples of the organic powder to be incorporated in the underlying layer include acryl styrene-based resin powder, benzoguanamine resin powder, melamine-based resin powder, and phthalocyanine-based pigment. Other examples of the organic powder employable herein include polyolefin-based resin powder, polyester-based resin powder, polyamide-based resin powder, polyimide-based resin powder, and polyethylene fluoride resin powder. The preparation of these organic powders can be accomplished by the process disclosed in JP-A-62-18564 and JP-A-60-255827.

Referring to the binder resin, lubricant, dispersant, additives and solvent to be used in the underlying layer and other conditions, those described below can be used. In particular, for the amount and kind of the binder resin, and the amount and kind of additives and dispersant, any known technique concerning the magnetic layer can be employed.

[Binder]

As the binder to be in the production process of the invention there may be used a conventional known thermoplastic resin, thermosetting resin, reactive resin or mixture thereof.

As the thermoplastic resin there may be used one having a glass transition temperature of from −100° C. to 150° C., a number-average molecular weight of from 1,000 to 200,00, preferably from 10,000to 100,000, and a polymerization degree of from about 50 to 1,000. Examples of such a thermoplastic resin include polymer or copolymer comprising as a constituent unit vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinylether, polyethane resin, and various rubber resins. Examples of the thermosetting resin or reactive resin include phenol resin, epoxy resin, polyurethane resin, urea resin, melamine resin, alkyd resin, acrylic reactive resin, formaldehyde resin, silicone resin, epoxypolyamide resin, mixture of polyester resin and isocyanate prepolymer, mixture of polyesterpolyol and polyisocyanate, and mixture of polyurethane and polyisocyanate. For the details of these resins, reference can be made to "Plastic Handbook", Asakura Shoten. A known electron radiation-curing resin may be incorporated in various layers. For the details of such an electron radiation-curing resin and its preparation process, reference can be made to JP-A-62-256219. These resins may be used singly or in combination. Preferred examples of these resins include vinyl chloride resin, combination of at least one vinyl chloride copolymer selected from the group consisting of vinyl chloride-vinyl acetate copolymer, vinyl chloride-vinyl acetate-vinyl alcohol copolymer and vinyl chloride-vinyl acetate-maleic anhydride copolymer, and combination thereof with a polyisocyanate.

As the polyurethane resin structure there may be used a known polyurethane structure such as polyester polyurethane, polyether polyurethane, polyether polyester polyurethane, polycarbonate polyurethane, polyester polycarbonate polyurethane and polycaprolactone polyurethane. All these exemplified binders preferably comprise at least one polar group selected from the group consisting of COOM, $SO_3M$, $OSO_3M$, $P=O(OM)_2$, $O—P=O(OM)_2$ (in which M is a hydrogen atom or alkaline metal salt), OH, $NR_2$, $N^+R_3$ (in which R is a hydrocarbon group), epoxy group, SH and CN introduced therein by copolymerization or addition reaction as necessary to obtain a better dispersibility and durability. The amount of such a polar group is from $10^{-1}$ to $10^{-9}$ mols/g, preferably from $10^{-2}$ to $10^{-6}$ mols/g.

Specific examples of these binders to be used in the production process of the invention include VAGH, VYHH, VMCH, VAGF, VAGD, VROH, VYES, VYNC, VMCC, XYHL, XYSG, PHHH, PKHJ, PKHC, PKFE (produced by Union Carbite Inc.), MPR-TA, MPR-TA5, MPR-TAL, MPR-TSN, MPR-TMF, MPR-TS, MPR-TM, MPR-TAO (produced by Nissin Chemical Industry Co., Ltd.), 1000W, DX80, DX81, DX83, 100FD (produced by DENKI KAGAKU KOGYO K.K.), MR-104, MR-105, MR110, MR100, MR-555, 400X-100A (produced by Nippon Zeon Co., Ltd.), Nippolan N2301, N2302, N2304 (produced by Nippon Polyurethane Industry Co., Ltd.), Pandex T-5105, T-R3080, T-5201, BURNOCK D-400, D-210-80, Crysbon 6109, 7209 (produced by DAINIPPON INK & CHEMICALS, INC.), Vylon UR8200, UR8300, UR8700, RV530, RV280 (produced by TOYOBO CO., LTD.), Daifelamine 4020, 5020, 5100, 5300, 9020, 9022, 7020 (produced by Dainichiseika Color & Chemicals Mfg. Co., Ltd.), 5004 (produced by Mitsubishi Chemical Corporation), SAN-PRENE SP-150 (produced by Sanyo Chemical Industries, Ltd.), and Saran F310, F210 (produced by Asahi Chemical Industry Co., Ltd.).

The binder to be incorporated in the non-magnetic layer and magnetic layer in the production process of the invention is used in an amount of from 5 to 50% by weight, preferably from 10 to 30% by weight based on the weight of the non-magnetic powder or ferromagnetic powder. The amount of a vinyl chloride-based copolymer, if any, to be used is from 5 to 30% by weight. The amount of a polyurethane resin, if any, to be used is from2 to 20% by weight. The amount of a polyisocyanate, if any, to be used is from 2 to 20% by weight. For example, if a slight amount of chlorine liberated corrodes the head, only the polyurethane resin may be used optionally in combination with the isocyanate resin. The polyurethane, if used herein, preferably exhibits a glass transition temperature of from –50° C. to 100° C., preferably 0° C. to 100° C., an elongation at break of from 100 to 2,000%, a stress at rupture of from 0.05 to 10 kg/cm$^2$ (0.49 to 98×10$^6$ Pa) and a yield point of from 0.05 to 10 kg/cm$^2$ (0.49 to 98×10$^6$ Pa).

In the case where two or more layers are formed on the non-magnetic support in the process for the production of a magnetic disk of the invention, it goes without saying that the amount of the binder, the amount of the vinyl chloride-based polymer, polyurethane resin, polyisocyanate or other resins to be incorporated in the binder, the molecular weight of various resins constituting the magnetic layer, the amount of the polar group, and the physical properties of these resins, etc. may it vary from the non-magnetic layer to the magnetic layer. Optimization should be conducted in each of these layers. Any known techniques concerning multi-layer magnetic layer can be applied. For example, if the amount of the binder varies from layer to layer, it is effective to increase the amount of the binder in the magnetic layer in order to lessen scratch on the surface of the magnetic layer. The improvement of touch of the magnetic recording medium to the recording head can be accomplished by increasing the amount of the binder in the non-magnetic layer so that they are rendered flexible.

Examples of the polyisocyanate to be used in the production process of the invention include isocyanates such as tolylene diisocyanate, 4-4-diphenylmethanediisocynate, hexamethylene diisocyanate, xylylene diisocyanate, naphthylene-1,5-diisocyanate, o-toluidine diisocyanate, isophorone diisocyanate and triphenylmethane triisocyanate, product of reaction of these isocyanates with polyalcohols, and polyisocyanates produced by condensation of isocyanates. Examples of trade name of commercially available isocyanates include Colonate L, Colonate HL, Colonate 2030, Colonate 2031, Millionate MR, Millionate MTL (produced by Nippon Polyurethane Industry Co., Ltd.), Takenate D-102, Takenate D-110N, Takenate D-200, Takenate D-202 (produced by Takeda Chemical Industries Ltd.), and Desmodur L, Desmodur IL, Desmodur N, Desmodur HL (produced by Sumitomo Bayer Co., Ltd.). These isocyanates may be used singly in the various layers. Alternatively, two or more of these isocyanates may be used in both the non-magnetic layer and magnetic layer in combination to make the best use of difference in hardening reactivity therebetween.

[Carbon black, Abrasive]

As the carbon black to be incorporated in the magnetic layer of the invention there may be used furnace black for rubber, thermal black for rubber, black for color, acetylene black or the like. The carbon black to be used herein preferably exhibits a specific surface area of from 5 to 500 m$^2$/g, DBP oil absorption of from 10 to 400 ml/100 g, a particle diameter of from 5 m$\mu$ to 300 m$\mu$, a pH value of from 2 to 10, a water content of from 0.1 to 10% by weight and a tap density of from 0.1 to 1 g/ml. Specific examples of the carbon black to be used in the production process of the invention include BLACKPEARLS 2000, 1300, 1000, 900, 905, 800, 700 and VULCANXC-72 (produced by Cabot Corporation), #80, #60, #55, #50, #35 (produced by Asahi Carbon Co., Ltd.), #2400B, #2300, #900, #1000, #30, #40, #10B (produced by Mitsubishi Chemical Corporation), CONDUCTEX SC, RAVEN 150, 50, 40, 15, RAVEN-MT-P (produced by Colombian Carbon Corporation), and KETJENBLACK EC (produced by Nihon EC). The carbon black may be subjected to surface treatment with a dispersant, may be subjected to grafting with a resin or graphitized partially on the surface thereof before use. The carbon black may be dispersed with a binder before being added to the magnetic coating compound. These carbon black powders may be used singly or in combination. The amount of the carbon black, if used, is preferably from 0.1 to 30% by weight based on the weight of the magnetic powder. The carbon black acts to inhibit electrostatic charge of the magnetic layer, reduce the friction coefficient of the magnetic layer, provide the magnetic layer with light-screening properties or enhance the strength of the magnetic layer depending on the kind of the carbon black used. Accordingly, these carbon black powders of the invention can be of course varied in their kind, amount and combination from the magnetic layer to the underlying layer and selected properly depending on the purpose on the basis of the foregoing various properties such as particle size, oil absorption, electrical conductivity and pH value. Optimization should be conducted in each of these layers. For the details of carbon black to be used in the magnetic layer in the production process of the invention, reference can be made to "Kaabon Burakku Binran (Handbook of Carbon Black)", Association of Carbon Black.

As abrasives to be used in the production process of the invention there may be mainly used known materials having a Mohs hardness of not lower than 6 such as α-alumina having a percent α conversion of not lower than 90%, β-alumina, silicon carbide, chromiumoxide, ceriumoxide, α-iron oxide, corrundum, artificial diamond, siliconnitride, silicon carbide, titanium carbide, titanium oxide, silicon dioxide and boron nitride, singly or in combination. Alternatively, a composite of these abrasives (abrasive surface-treated with another abrasive) may be used. These abrasives occasionally contain compounds or elements other than main components. However, these abrasives remain the same in their effect so far as the content of the main components is not lower than 90% by weight. The particle size of these abrasives is preferably from 0.01 to 2 μm. In order to enhance electromagnetic properties in particular, it is preferred that these abrasives have a sharp distribution of particle size. Further, in order to enhance durability, abrasives having different particle sizes may be used in combination as necessary. Alternatively, a single abrasive having a wide distribution of particle diameter may be used to exert the same effect. The abrasive to be used in the invention preferably exhibits a tap density of from 0.3 to 2 g/cc, a water content of from 0.1 to 5% by weight, a pH value of from 2 to 11 and a specific surface area of from 1 to 30 m$^2$/g. The shape of the abrasive to be used in the invention may be any of needle, sphere and cube. The abrasive preferably has a partly cornered shape to have high grinding properties. Specific examples of the abrasive employable herein include AKP-12, AKP-15, AKP-20, AKP-30, AKP-50, HIT-20, HIT-55, HIT-60, HIT-70, HIT-80, HIT-100 (produced by SUMITOMO CHEMICAL CO., LTD.), ERC-DBM, HP-DBM, HPS-DBM (produced by Reynolds Inc.), WA1000 (produced by Fujimi Incorporated), UB20 (produced by Uyemura & CO., LTD.), G5 (produced by Nippon Chemical Industrial Co., Ltd., Chromex U2 (produced by CHROMEX INC.), TF-100, TF-140 (produced by TODAKOGYO CORP.), Beta Random Ultrafine (produced by IBIDEN CO., LTD.), and B-3 (produced by SHOWA MINING CO., LTD). These abrasives may be incorporated in the non-magnetic layer as necessary. By incorporating these additives in the non-magnetic layer, the surface shape of the non-magnetic layer or the degree of protrusion of abrasive can be controlled. Of course, the particle diameter and amount of the abrasive to be incorporated in the magnetic layer and non-magnetic layer should be optimized.

[Additive]

As additives to be used in the formation of the magnetic layer and non-magnetic layer in the production process of the invention there may be used those having lubricating effect, antistatic effect, dispersing effect, plasticizing effect, etc. Examples of these additives employable herein include molybdenum disulfide, tungsten disulfide, graphite, boron nitride, fluorinated graphite, silicone oil, silicone having polar group, aliphatic acid-modified silicone, fluorine-containing silicone, fluorine-containing alcohol, fluorine-containing ester, polyolefin, polyglycol, alkyphosphoric acid ester, alkaline metal salt thereof, alkylsulfuric acid ester, alkaline metal salt thereof, polyphenylether, phenylphosphonic acid, α-naphthylphosphoric acid, phenylphosphoric acid, diphenylphosphoric acid, p-ethylbenzenephosphonic acid, phenylphosphinic acid, aminoquinones, various silane coupling agents, titanium coupling agents, fluorine-containing alkylsulfuric acid ester, alkaline metal salt thereof, monobasic aliphatic acid having from 10 to 24 carbon atoms (which may have unsaturated bonds or may be branched), salt thereof with a metal (e.g., Li, Na, K, Cu), monoaliphatic acid ester, dialiphatic acid ester or trialiphatic acid ester of any one of monovalent, divalent, trivalent, tetravalent, pentavalent and hexavalent alcohols having from 12 to 22 carbon atoms (which may have unsaturated bonds or may be branched), alkoxyalcohol having from 12 to 22 carbon atoms, monobasic aliphatic acid having from 10 to 24 carbon atoms (which may have unsaturated bonds or may be branched) and monovalent, divalent, trivalent, tetravalent, pentavalent and hexavalent alcohols having from 2 to 12 carbon atoms (which may have unsaturated bonds or may be branched), aliphatic acid ester of monoalkylether of alkylene oxide polymer, aliphatic acid amide having from 8 to 22 carbon atoms, and aliphatic amine having from 8 to 22 carbon atoms.

Specific examples of these compounds include aliphatic acids such as capric acid, caprylic acid, lauric acid, myristic acid, palmitic acid, stearic acid, behenic acid, oleic acid, elaidic acid, linoleic acid, linolenic acid and isostearic acid, esters such as butyl stearate, octyl stearate, amyl stearate, isooctyl stearate, butyl myristate, octyl myristate, butoxy ethyl stearate, butoxydiethyl stearate, 2-ethylhexyl stearate, 2-octytldodecyl palmitate, 2-hexylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate and ethylene glycol dioleate, and alcohols such as oleyl alcohol, stearyl alcohol and lauryl alcohol. Other examples of additives employable herein include nonionic surface active agent such as alkylene oxide-based surface active agent, glycerin-based surface active agent, glycidol-based surface active agent and alkylphenol ethylene oxide adduct, cationic surface active agent such as cyclic amine, esteramide, quaternary ammonium salt, hydantoin derivative, heterocyclic group, phosphonium and sulfonium, anionic surface active agent containing acid group such as carboxylic acid, sulfonic acid, phosphoric acid, sulfuric acid ester group and phosphoric acid ester group, and amphoteric surface active agent such as amino acid, aminosulfonic acid, sulfuric or phosphoric acid ester of amino alcohol and alkylbetaine. For the details of these surface active agents, reference can be made to "Kaimen Kasseizai Binran (Handbook of Surface Active Agents", Sangyo Tosho. These lubricants, antistats or other additives may not be 100%. pure but may contain impurities such as unreacted matter, by-product, decomposition product and oxide besides main components. The content of these impurities is preferably not higher than 30%, more preferably not higher than 10%.

These lubricants and surface active agents to be used in the production process of the invention have different physical actions. The kind and amount of these lubricants and surface active agents and the proportion of lubricant to be used in combination should be optimized depending on the purpose. For example, the aliphatic acids to be incorporated in the non-magnetic layer and the magnetic layer may differ from each other in melting point to keep the oozing to the surface of the magnetic recording medium under control. The esters to be used in the non-magnetic layer and the magnetic layer may differ from each other in boiling point or polarity to keep the oozing to the surface of the magnetic recording medium under control. The amount of the surface active agents to be used in the non-magnetic layer and the magnetic layer may be properly adjusted to improve the coating stability. The amount of the lubricant to be incorporated in the underlying layer may be greater than that in the magnetic layer to enhance the lubricating effect. Of course, the present invention is not limited to these proposals. In general, the total amount of lubricant to be used is predetermined to be from 0.1% to 50%, preferably from 2% to 25% based on the amount of the ferromagnetic powder or non-magnetic powder.

The additives to be used in the invention may be entirely or partly added at any steps during the preparation of the magnetic coating compound and non-magnetic coating compound. For example, these additives may be mixed with the magnetic powder before the kneading step. Alternatively, these additives may be added at the step of kneading the magnetic powder with the binder and solvent. These additives may be added at, after or shortly before the dispersion step. Depending on the purpose, the application of the magnetic layer may be followed by simultaneous or successive coating of a part or whole of these additives. Alternatively, depending on the purpose, the magnetic layer which has been calendered or slit may be coated with a lubricant.

As the organic solvent to be used in the production process of the invention there may be used a known organic solvent. For example, solvents disclosed in JP-A-6-68453 may be used.

[Layer Arrangement]

The thickness of the magnetic disk formed by the production process of the invention is from 2 μm to 100 μm, preferably from 10 μm to 80 μm. In the case where a single magnetic layer is provided, the thickness of the magnetic layer is preferably from 0.02 μm to 2.0 μm, more preferably from 0.02 μm to 0.5 μm.

An undercoating layer may be provided interposed between the support and the non-magnetic layer or magnetic layer for the purpose of enhancing the adhesion therebetween. The thickness of the undercoating layer is from 0.01 μm to 0.5 μm, preferably from 0.02 μm to 0.5 μm.

In the case where the magnetic layer is provided on one side of the support, a back coat layer may be provided on the side of the support opposite the magnetic layer to exert an effect of preventing electrostatic charge or correcting curling. The thickness of the back coat layer is from 0.1 μm to 4 μm, preferably from 0.3 μm to 2.0 μm. As the undercoating layer and back coat layer there may be used any known materials.

The thickness of the magnetic layer in the magnetic disk formed by the production process of the invention is optimized according to the saturated magnetization of the head to be used on the magnetic disk thus obtained, the length of head gap and the band width of signal to be recorded. The magnetic layer may be divided into two or more layers having different magnetic properties. Any known multilayer magnetic layer arrangement may be employed.

In the case where the magnetic disk formed by the production process of the invention is of ATOMM type, the thickness of the non-magnetic layer as underlying layer is normally from not smaller than 0.2 μm to not greater than 5.0 μm, preferably from not smaller than 0.3 μm to not greater than 3.0 μm, even more preferably from not smaller than 1.0 μm to not greater than 2.5 μm. In this case, the underlying layer in the magnetic disk can exert its effect so far as it is a substantially non-magnetic layer. Even when the underlying layer contains a small amount of a magnetic material as an impurity or intentionally, the desired effect can be exerted. Thus, it goes without saying that this structure can be regarded as the same structure as the magnetic disk obtained by the production process of the invention. The term "substantially non-magnetic layer" as used herein is meant to indicate that the underlying layer exhibits a residual magnetic reflux density of not greater than 30 mT (300 G) or a coercive force of not greater than 24 kA/m (300 Oe), preferably has no residual magnetic reflux density and coercive force.

[Support]

As the support to be used in the production process of the invention there maybe used any known film such as polyester (e.g., polyethylene terephthalate, polyethylene naphthalate), polyolefin, cellulose triacetate, polycarbonate, polyamide, polyimide, polyamidimide, polysulfone, aramide and aromatic polyamide. A high strength support such as polyethylene naphthalate and polyamide is preferably used. If necessary, a laminated type support as disclosed in JP-A-3-224127 may be used to change the surface roughness of the magnetic layer and base. The support to be used herein may be subjected to corona discharge treatment, plasma treatment, treatment for easy adhesion, heat treatment, dusting, etc. before use. Alternatively as the support to be used in the production process of the invention there may be used an aluminum or glass substrate.

In order to accomplish the basic desired object, a support having a central area average surface roughness SRa of not greater than 8.0 nm, preferably not greater than 4.0 mm, more preferably not greater than 2.0 nm as determined by mirau method of TOPO-3D produced by WYKO INC. is preferably used. The support preferably not only has a small central line average roughness but also has no big protrusions having a size of not smaller than 0.5 μm. If necessary, the roughness shape of the surface of the support may be freely controlled by the size and amount of filler to be incorporated therein. Examples of the filler include oxide and carbonate of Ca, Si and Ti, and fine powder of organic material such as acryl. The support preferably has a maximum height SRmax of not greater than 1 μm, a ten point average roughness SRz of not greater than 0.5 μm, a central area rise height SRp of not greater than 0.5 μm, a central area valley depth SRv of not greater than 0.5 μm, a central area rate SSr of from not smaller than 10% to not greater than 90%, and an average wavelength Sλ a of from not smaller than 0.5 μm to not greater than 300 μm. In order to obtain desired electromagnetic properties and durability, the surface rise distribution on the support can be arbitrarily controlled by using a filler. In some detail, from 0 to 2,000 filler particles each having a size of from 0.01 μm to 1 μm may be used per 0.1 mm$^2$.

The support to be used in the production process of the invention preferably exhibits F-5 value of from 5 to 50 Kg/mm$^2$ (4.9 to 49×107 Pa) and a thermal shrinkage coefficient of not greater than 3%, more preferably not greater than 1.5% at 100° C. for 30 minutes, or not greater than 1%, more preferably not greater than 0.5% at 80° C. for 30 minutes. The support exhibits a breaking strength of from 5 to 100 Kg/mm$^2$ (4.9 to 98×10$^7$ Pa) and an elastic modulus of from 100 to 2,000 Kg/mm$^2$ (98 to 1,960×10$^7$ Pa) The support exhibits a thermal expansion coefficient of from 10$^{-4}$ to 10$^{-8}$/° C., preferably from 10$^{-5}$ to 10$^{-6}$/° C. The support exhibits a hygroscopic expansion coefficient of not greater than 10$^{-4}$/RH %, preferably 10$^{-5}$/RH %. The thermal properties, dimensional properties and mechanical strength of the support are preferably equal in the various in-plane directions with a difference of not greater than 10%.

[Production Process]

The process for the production of the magnetic disk of the invention involves at least a kneading step, a dispersing step, and a mixing step optionally provided before and after these steps. These steps may each consist of two or more stages. All the starting materials to be used in the invention such as ferromagnetic powder, non-magnetic powder, binder, carbon black, abrasive, antistat, lubricant and solvent may be added at the beginning of or in the course of any steps. These starting materials may be each batchwise added at two or more steps. For example, a polyurethane resin may be added batchwise at a kneading step, a dispersing step, and a mixing step for adjusting the viscosity of the coating solution thus dispersed. In order to accomplish the objects of the invention, a conventional known production technique may be used as a part of the production process. At the kneading step, a device having a high kneading force such as open kneader, continuous kneader, pressure kneader and extruder can be used. In the case where a kneader is used, the magnetic powder is kneaded with whole or part of the non-magnetic powder (preferably not lower than 30% of the total amount of the binder) in an amount of from 15 to 500 parts by weight based on 100 parts by weight of the magnetic powder. For the details of the kneading step, reference can be made to Japanese Patent Application No. 62-264722 and Japanese Patent Application No. 62-236872. In the case where the coating solution for the non-magnetic layer and non-magnetic layer are prepared, dispersing media having a high specific gravity such as zirconia beads, titania beads and steel beads are preferably used. The particle diameter and packing of these dispersing media are optimized for use. As the dispersing machine there maybe used any known dispersing machine.

In the case where a multi-layer magnetic disk is produced by coating according to the production process of the invention, the following process is preferably used. Firstly, a lower layer is applied using a coating device commonly used in the application of magnetic coating compound such as gravure coating device, roll coating device, blade coating device and extrusion coating device. While the lower is wet, an upper layer is applied using a support pressure type extrusion coating device disclosed in JP-B-1-46186, JP-A-60-238179, and JP-A-2-265672. Secondly, an upper layer and a lower layer are almost simultaneously applied using one coating head having two coating solution passing slits as disclosed in JP-A-63-88080, JP-A-2-17971, and JP-A-2-265672. Thirdly, an upper layer and a lower layer are almost simultaneously applied using an extrusion coating device with a backup roll as disclosed in JP-A-2-174965. In order to prevent the deterioration of electromagnetic characteristics of the magnetic disk due to agglomeration of magnetic particles, it is preferred that a method disclosed in JP-A-62-95174 and JP-1-236968 be used to provide the coating solution in the coating head with shear. The coating solution needs to have a viscosity falling within the range defined in Japanese Patent Application No. 1-312659. In order to realize the desired arrangement of magnetic disk according to the production process of the invention, a successive multi-layer coating process maybe, of course, used involving the application and drying of the underlying layer followed by the provision of the magnetic layer. Even when this successive multi-layer coating process is used, the effect of the invention cannot be impaired. However, in order to lessen coating defectives and hence improve quality such as dropout resistance, the foregoing simultaneous multi-layer coating process is preferably used.

The orientation is preferably conducted by controlling the temperature and amount of drying air and the coating speed so that the drying position of coat layer can be controlled. The coating speed is preferably from 20 to 1,000 m/min. The temperature of the drying air is preferably not lower than 60° C. A proper previous drying can be conducted before the coated material enters in the magnet zone.

As the calendering roll there may be used a heat-resistant plastic roll made of epoxy, polyimide, polyamide, polyimidamide or the like. Alternatively, metallic rolls may be used opposed to each other if a double-sided magnetic layer is formed. The calendering temperature is preferably not lower than 50° C., more preferably not lower than 100° C. The linear pressure is preferably not lower than 200 kg/cm ($1.96 \times 10^7$ Pa/cm), more preferably not lower than 300 kg/cm ($2.94 \times 10^7$ Pa/cm).

[Physical Properties]

The magnetic disk produced by the production process of the invention preferably exhibits a surface resistivity of from $10^4$ to $10^{12}$ Ω/sq on the magnetic surface thereof and a charged potential of from −500 V to +500 V. The magnetic layer preferably has an elastic modulus of from 100 to 2,000 kg/mm$^2$ at 0.5% elongation in the various directions in plane and a break strength of from 10 to 70 kg/cm$^2$ (9.8 to $58.6 \times 10^7$ Pa). The magnetic disk preferably has an elastic modulus of from 100 to 1,500 kg/mm2 in the various directions in plane and a residual elongation of not greater than 0.5%, and a thermal shrinkage factor of not greater than 1%, more preferably not greater than 0.5%, most preferably not greater than 0.1% at all temperatures lower than 100° C. The content of residual solvent in the magnetic layer is preferably not greater than 100 mg/m$^2$, more preferably not greater than 10 mg/m$^2$. The content of residual solvent in the coat layer is preferably not greater than 30 vol-%, more preferably not greater than 20 vol-% both in the underlying layer and magnetic layer. The void is preferably not greater than 30 vol-%, more preferably not greater than 20 vol-% both in the non-magnetic layer and magnetic layer. The void is preferably small to attain a high output. However, it is occasionally preferred that the void be greater than a certain value depending on the purpose. Further, since the repeated use is thought much of, the coat layer preferably has a great void to exhibit a good running durability.

The central area surface roughness Ra of the magnetic layer as measured by mirau method of TOPO-3D is not greater than 4.0 nm, preferably not greater than 3.8 nm, more preferably not greater than3.5 nm. The magnetic layer preferably exhibits a maximum height SRmax of not greater than 0.5 μm, a ten point average roughness SRz of not greater than 0.3 μm; a central area rise height SRp of not greater than 0.3 μm, a central area valley depth SRv of not greater than 0.3 μm a central area rate SSr of from not smaller than 20% to not greater than 80%, and an average wavelength Sλa of from not smaller than 5 μm to not greater than 300 μm. The surface rise on the magnetic layer can be arbitrarily predetermined to be from 0 to 2,000 rises each having a size of from 0.01 μm to 1 μm per 0.1 mm$^2$. In this manner, the electromagnetic properties and frictional coefficient of the magnetic layer is preferably optimized. This can be easily controlled by controlling the surface properties of the filler to be incorporated in the support or controlling the particle diameter and amount of the powder to be incorporated in the magnetic layer and the surface shape of the calendering roll. The curling of the magnetic layer is preferably within ±3 mm (according to the sheet sample measuring process defined in ISO18910).

In the case where the magnetic disk comprises a non-magnetic layer and a magnetic layer, it can be easily presumed that these physical properties can be varied from the non-magnetic layer to the magnetic layer depending on the purpose. For example, the elastic modulus of the magnetic layer can be enhanced to improve the running durability thereof. At the same time, the elastic modulus of the non-magnetic layer can be lowered from that of the magnetic layer to improve the touch of the magnetic disk to the head.

The present invention will be further described in the following examples, but the present invention should not be construed as being limited thereto.

The following predetermined coating compound was prepared. The coating compound was then applied to a support to produce a magnetic disk.

[Preparation of Coating Compound]

| Magnetic coating compound A | |
|---|---|
| Ferromagnetic metal powder | 100 parts by mass |
| Formulation: Fe 70%; Co 30% | |
| HC major axis length: see FIGS. 1A and 1B | |
| Crystalline size: 150 angstrom | |
| σs: 150 emu/g | |
| Sintering inhibitor: | |
| Al compound (Al/Fe atomic ratio: 14%) | |
| Y compound (Y/Fe atomic ratio: 7%) | |
| Vinyl chloride copolymer | 10 part by mass |
| MR110 (produced by Nippon Zeon Co., Ltd.) | |
| Polyurethane resin | 4 parts by mass |
| UR820o (produced by TOYOBO Co., LTD.) | |
| αAlumina | |
| HIT60 (produced by SUMITOMO CHEMICAL CO., LTD.) | 5 parts by mass |
| Carbon black | 1 part by mass |
| #50 (produced by Asahi Carbon Co., Ltd.) | |
| Phenylphosphonic acid | 3 parts by mass |
| n-Butyl stearate | 3 parts by mass |
| Butoxyethyl stearate | 3 parts by mass |
| Ethylene glycol dioleate | 6 parts by mass |
| Stearic acid | 1 part by mass |
| Oleic acid | 1 part by mass |
| Methyl ethyl ketone | 140 parts by mass |
| Cyclohexanone | 200 parts by mass |
| Magnetic coating compound B | |
| Hexagonal barium ferrite | 100 parts by mass |
| Surface treatment: Al$_2$O$_3$ 5% by mass, | |
| SiO$_2$: 2% by mass | |
| Hc, plate diameter: see FIGS. 1A and 1B | |
| Tabularity ratio: 3 | |
| σs: 56 emu/g | |
| Vinyl chloride copolymer | 6 parts by mass |
| MR110 (produced by Nippon Zeon Co., Ltd.) | |
| Polyurethane resin | 3 parts by mass |
| UR8200 (produced by TOYOBO co., LTD.) | |
| α-Alumina | 5 parts by mass |
| HIT60 (produced by SUMITOMO CHEMICAL CO., LTD.) | |
| Carbon black | 1 part by mass |
| #50 (produced by Asahi Carbon Co., Ltd.) | |
| n-Butyl stearate | 3 parts by mass |
| Butoxyethyl stearate | 3 parts by mass |
| Ethylene glycol dioleate | 6 parts by mass |
| Stearic acid | 1 part by mass |
| Oleic acid | 1 part by mass |
| Methyl ethyl ketone | 80 parts by mass |
| Cyclohexanone | 120 parts by mass |
| Non-magnetic coating compound | |
| Non-magnetic powder: TiO$_2$ crystalline rutile | 100 parts by mass |
| Average primary particle diameter: 0.035 μm | |
| Specific surface area: 40 m$^2$/g | |
| pH: 7 | |
| TiO$_2$ content: 90% or more | |
| DBP oil absorption: 27–38 g/100 g | |
| Surface treatment: Al$_2$O$_3$, SiO$_2$ | |
| Carbon black | 13 parts by mass |
| KETJENBLACK EC | |
| Vinyl chloride copolymer | 17 parts by mass |
| MR110 (produced by Nippon Zeon Co., Ltd.) | |
| Polyurethane resin | 6 parts by mass |
| UR8600 (produced by TOYOBO co., LTD.) | |
| Phenylphosphonic acid | 3 parts by mass |

| -continued | |
|---|---|
| Ethylene glycol dioleate | 8 parts by mass |
| n-Butyl stearate | 4 parts by mass |
| Butoxyethyl stearate | 4 parts by mass |
| Oleic acid | 1 part by mass |
| Stearic acid | 1 part by mass |
| Methyl ethyl ketone | 120 parts by mass |
| Cyclohexanone | 180 parts by mass |

For each of the coating compounds, the various components were kneaded by a kneader, and then subjected to dispersion by a sand mill. To the dispersions thus obtained were then added a polyisocyanate in an amount of 13 parts by mass for the coating solution of non-magnetic layer, 4 parts by mass for the coating solution of magnetic layer A and 5 parts by mass for the coating solution of magnetic layer B. To these dispersions were then each added 30 parts by mass of cyclohexanone. These dispersions were then each filtered through a filter having an average pore diameter of 1 μm to prepare a non-magnetic layer-forming coating solution and a magnetic layer-forming coating solution.

The non-magnetic layer coating solution was applied to a polyethylene terephthalate support having a thickness of 62 μm and a central area average surface roughness of 3 nm to a dry thickness of 1.5 μm. The magnetic layer coating solution was immediately applied to the polyethylene terephthalate support to a dry thickness of 0.15 μm in a simultaneous multi-layer coating manner. While the two layers were wet, the coated material was subjected to random orientation under the following orientation conditions 1 to 3. After dried, the coated material was processed through a 7-stage calender at a temperature of 90° C. and a linear pressure of 300 kg/cm ($2.94 \times 10^7$ Pa/cm), and then punched into a 3.7 inch diameter disk. The disk was subjected to surface polishing, put in a 3.7 inch cartridge (zip-disk cartridge produced by Iomega Corporation), and then provided with predetermined mechanism parts to obtain a 3.7 inch floppy disk.

Production Process 2

A non-magnetic layer-forming coating solution and a magnetic layer-forming coating solution were prepared in the same manner as in the production process 1. The non-magnetic layer coating solution thus prepared was applied to a polyethylene terephthalate support having a thickness of 62 μm and a central area average surface roughness of 3 nm to a dry thickness of 1.5 μm, and then dried. The magnetic layer coating solution was then applied to the polyethylene terephthalate support to a dry thickness of 0.15 μm. While the magnetic layer was wet, the coated material was subjected to random orientation under the following orientation conditions 1 to 3. After dried, the coated material was processed through a 7-stage calender at a temperature of 90° C. and a linear pressure of 300 kg/cm ($2.94 \times 10^7$ Pa/cm), and then punched into a 3.7 inch diameter disk. The disk was subjected to surface polishing, put in a 3.7 inch cartridge (zip-disk cartridge produced by Iomega Corporation), and then provided with predetermined mechanism parts to obtain a 3.7 inch floppy disk.

Production Process 3

A magnetic layer-forming coating solution obtained in the same manner as in the production process 1 was applied to a polyethylene terephthalate support having a thickness of 62 μm and a central area average surface roughness of 3 nm to a dry thickness of 1.5 μm. While the magnetic layer was wet, the coated material was subjected to random orientation under the following orientation conditions 1 to 3. After dried, the coated material was processed through a 7-stage calender at a temperature of 90° C. and a linear pressure of 300 kg/cm (2.94 ×10$^7$ Pa/cm), and then punched into a 3.7 inch diameter disk. The disk was subjected to surface polishing, put in a 3.7 inch cartridge (zip-disk cartridge produced by Iomega Corporation), and then provided with predetermined mechanism parts to obtain a 3.7 inch floppy disk.

Orientation Condition 1

The coated material was passed through an alternating magnetic field generator at a frequency and an intensity of magnetic field set forth in Table 1.

Orientation Condition 2

A pair of same-pole-opposed Co magnets with the support interposed therebetween was provided so that the longitudinal direction of the magnet pair was in parallel to the conveying direction of the support, and a magnetic field was applied in such an arrangement that the center of the gap has an intensity of magnetic field set forth in Table 1 so as to subject magnetic particles to orientation. The coated material was then passed through the foregoing alternating magnetic field generator.

Orientation Condition 3

The magnetic fields in the directions of the oblique direction and the reverse oblique direction were applied with at least one set of pairs of same-pole-opposed Co magnets whose longitudinal direction axis was arranged with the angle with the longitudinal direction of support set forth in Table 1. The coated material was then passed through the foregoing alternating magnetic field generator.

The samples thus obtained were each then evaluated by the following properties. The results are set forth in Table 1.

Electromagnetic properties

Measurement of S/N ratio

For the measurement of S/N ratio, a Type RWA1001 disk evaluating device produced by GUZIK INC. (U.S.A.) and a Type LS-90 spin stand produced by Kyodo Electronics System Co., Ltd. were used. Using a metal-in gap head having a gap length of 0.3 $\mu$m, the reproduced output (TAA) at a linear recording density of 90KFCI and the noise level after DC erase were measured at a radius of 24.6 mm to determine S/N ratio.

Measurement of modulation

Using the same conditions and apparatus as in the measurement of reproduced output, the maximum Vmax and minimum Vmin in one cycle of reproduced waveform were measured. Modulation was determined by the following equation:

$$((Vmax-Vmin)/(Vmax+Vmin))\times 100\ (\%)$$

Measurement of Hc and SQn of magnetic layer

Using a vibrating sample type magnetic flux meter (produced TOEI INDUSTRY CO., LTD.), measurement was made at Ha of 10 KOe.

TABLE 1

| Sample No. | Magnetic solution | Hc (Oe) | Average major axis length or average plate dia. ($\mu$m) | Production process | Direction of orientation | Intensity of magnetic field (Oe) | Angle to longitudinal direction (°) | Number of magnets (set) | Angle between magnets facing in opposite directions | Alternating magnetic field Intensity of magnetic field (Oe) | Alternating magnetic field Frequency (Hz) | S/N (dB) | % Modulation |
|---|---|---|---|---|---|---|---|---|---|---|---|---|---|
| 1 | A | 2,300 | 0.075 | 1 | 1 | — | — | — | — | 250 | 55 | 0.0 | 100 |
| 2 | A | 2,300 | 0.075 | 1 | 2 | 1,000 | 90 | — | — | 250 | 55 | 1.0 | 85 |
| 3 | A | 2,300 | 0.075 | 1 | 3 | 1,000 | 45 | 1 | 90 | 250 | 55 | 5.0 | 100 |
| 4 | A | 2,300 | 0.075 | 1 | 3 | 700 | 45 | 1 | 90 | 250 | 55 | 2.0 | 100 |
| 5 | A | 2,300 | 0.075 | 1 | 3 | 2,000 | 45 | 1 | 90 | 250 | 55 | 5.0 | 100 |
| 6 | A | 2,300 | 0.075 | 1 | 3 | 5,000 | 45 | 1 | 90 | 250 | 55 | 4.5 | 100 |
| 7 | A | 2,300 | 0.075 | 1 | 3 | 10,000 | 45 | 1 | 90 | 250 | 55 | 4.0 | 95 |
| 8 | A | 2,300 | 0.075 | 1 | 3 | 1,000 | 55 | 1 | 70 | 250 | 55 | 4.0 | 90 |
| 9 | A | 2,300 | 0.075 | 1 | 3 | 1,000 | 50 | 1 | 80 | 250 | 55 | 5.0 | 100 |
| 10 | A | 2,300 | 0.075 | 1 | 3 | 1,000 | 40 | 1 | 100 | 250 | 55 | 5.0 | 100 |
| 11 | A | 2,300 | 0.075 | 1 | 3 | 1,000 | 35 | 1 | 110 | 250 | 55 | 4.0 | 90 |
| 12 | A | 2,300 | 0.075 | 1 | 3 | 1,000 | 45 | 2 | 90 | 250 | 55 | 5.5 | 100 |
| 13 | A | 2,300 | 0.075 | 1 | 3 | 1,000 | 45 | 3 | 90 | 250 | 55 | 60 | 100 |
| 14 | A | 2,300 | 0.075 | 1 | 3 | 2,000 | 45 | 1 | 90 | OFF | OFF | 1.0 | 85 |
| 15 | A | 2,300 | 0.075 | 1 | 3 | 2,000 | 45 | 1 | 90 | 30 | 55 | 3.0 | 90 |
| 16 | A | 2,300 | 0.075 | 1 | 3 | 2,000 | 45 | 1 | 90 | 1,000 | 55 | 4.0 | 100 |
| 17 | A | 2,300 | 0.075 | 1 | 3 | 2,000 | 45 | 1 | 90 | 2,000 | 55 | 5.0 | 100 |
| 18 | A | 1,200 | 0.075 | 1 | 3 | 1,000 | 45 | 1 | 90 | 250 | 55 | 1.0 | 100 |
| 19 | A | 1,400 | 0.075 | 1 | 3 | 1,000 | 45 | 1 | 90 | 250 | 55 | 3.0 | 100 |
| 20 | A | 3,500 | 0.075 | 1 | 3 | 1,000 | 45 | 1 | 90 | 250 | 55 | 6.0 | 100 |
| 21 | A | 3,800 | 0.075 | 1 | 3 | 1,000 | 45 | 1 | 90 | 250 | 55 | 1.0 | 100 |
| 22 | A | 2,300 | 0.2 | 1 | 3 | 1,000 | 45 | 1 | 90 | 250 | 55 | 1.0 | 100 |
| 23 | A | 2,300 | 0.1 | 1 | 3 | 1,000 | 45 | 1 | 90 | 250 | 55 | 3.0 | 100 |
| 24 | A | 2,300 | 0.05 | 1 | 3 | 1,000 | 45 | 1 | 90 | 250 | 55 | 4.0 | 100 |
| 25 | A | 2,300 | 0.075 | 2 | 3 | 1,000 | 45 | 1 | 90 | 250 | 55 | 3.0 | 100 |
| 26 | A | 2,300 | 0.075 | 3 | 1 | — | — | — | — | 250 | 55 | -2.0 | 100 |
| 27 | A | 2,300 | 0.075 | 3 | 2 | 1,000 | 90 | — | — | 250 | 55 | 0.0 | 85 |
| 28 | A | 2,300 | 0.075 | 3 | 3 | 1,000 | 45 | 1 | 90 | 250 | 55 | 2.0 | 100 |
| 29 | B | 2,800 | 0.025 | 1 | 1 | — | — | — | — | 250 | 55 | 0.0 | 100 |
| 30 | B | 2,800 | 0.025 | 1 | 2 | 1,000 | 90 | — | — | 250 | 55 | 1.0 | 90 |
| 31 | B | 2,800 | 0.025 | 1 | 3 | 1,000 | 45 | 1 | 90 | 250 | 55 | 5.0 | 100 |

As can be seen in the results of Table 1, the samples obtained by the production process involving the two-way orientation in the oblique and the reverse oblique directions by the application of the first external magnetic field and the random orientation by the alternating second external magnetic field exhibit remarkably improved S/N ratio and modulation as compared with the comparative samples obtained by other processes.

In accordance with the process of a magnetic disk of the invention, even if as a magnetic powder there is one having a small particle size, the agglomeration of magnetic particles to each other can be relaxed. Further, the orientation of vertical component of magnetization can be inhibited. Thus, the drastic reduction of noise can be attained. Moreover, the magnetic disk according to the invention has an orientation ratio (Or) close to 1 in the plane of magnetic layer and a good modulation. Accordingly, the use of the production process of the invention makes it possible to invariably obtain a large capacity magnetic disk having a good S/N ratio and modulation suitable for digital recording.

This application is based on Japanese patent application JP 2000-357743, filed Nov. 24, 2000, the entire content of which is hereby incorporated by reference, the same as if set forth at length.

What is claimed is:

1. A process for producing a magnetic disk having a randomly oriented magnetic powder, which comprises:

applying a magnetic coating solution containing at least a magnetic powder to a web that is being continuously conveyed, so as to prepare a magnetic layer;

applying a first external magnetic field to the magnetic layer while the magnetic layer is wet; and applying a second external magnetic field to the magnetic layer while the magnetic layer is wet, wherein:

the first external magnetic field is applied with a set of a first pair of same-pole-opposed magnets with the web interposed therebetween and a second pair of same-pole-opposed magnets with the web interposed therebetween; the first and second pairs are provided on the same plane of the web and on two equal sides of an isosceles triangle so that a perpendicular line dropped from a base of the isosceles triangle forms a line perpendicular to a conveying direction of the web; and the second external magnetic field is an alternating magnetic field, and is applied with a pair of magnets with the web interposed therebetween; the pair of magnets being provided on the same plane of the web, and in a direction perpendicular to the conveying direction of the web.

2. The process for producing a magnetic disk according to claim 1, wherein the same-pole-opposed magnets in each of the first and second pairs are a pair of permanent magnets, and the intensity of magnetic field in a center of a gap between the opposed permanent magnets in each of the first and second pairs is from 1/3 to 10 times the coercive force of the magnetic layer.

3. The process for producing a magnetic disk according to claim 1, wherein the random orientation by the application of an alternating magnetic field is effected in such a manner that the intensity of the second external magnetic field is from 1/40 to 10 times the intensity of the first external magnetic field.

4. The process for producing a magnetic disk according to claim 1, wherein the magnetic powder is a ferromagnetic metal powder having Hc of from 114 to 280 kA/m (from 1,400 to 3,500 Oe) and an average major axis length of from 0.01 $\mu$m to 0.18 $\mu$m.

5. The process for producing a magnetic disk according to claim 1, wherein the magnetic powder is a hexagonal ferrite magnetic material having an average plate diameter of from 0.01 $\mu$m to 0.1 $\mu$m.

* * * * *